US009664249B2

(12) United States Patent
Kowalchuk

(10) Patent No.: US 9,664,249 B2
(45) Date of Patent: May 30, 2017

(54) SYSTEM AND METHOD OF TRACTOR CONTROL BASED ON AGRICULTURAL IMPLEMENT PERFORMANCE

(71) Applicant: CNH Canada, Ltd., Saskatoon (CA)

(72) Inventor: Trevor Kowalchuk, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 68 days.

(21) Appl. No.: 13/739,394

(22) Filed: Jan. 11, 2013

(65) Prior Publication Data

US 2014/0196919 A1     Jul. 17, 2014

(51) Int. Cl.
| | |
|---|---|
| *A01B 67/00* | (2006.01) |
| *F16F 15/02* | (2006.01) |
| *A01B 63/00* | (2006.01) |
| *A01B 63/32* | (2006.01) |
| *A01C 7/20* | (2006.01) |
| *A01B 79/00* | (2006.01) |

(52) U.S. Cl.
CPC ............ *F16F 15/02* (2013.01); *A01B 63/002* (2013.01); *A01B 63/32* (2013.01); *A01C 7/205* (2013.01); *A01B 67/00* (2013.01); *A01B 79/005* (2013.01)

(58) Field of Classification Search
CPC ..... A01B 67/00; A01B 63/111; A01B 79/005; A01C 7/205; A01C 7/102
USPC .................................................... 172/2, 3, 4
See application file for complete search history.

(56) References Cited

U.S. PATENT DOCUMENTS

| | | | |
|---|---|---|---|
| 3,497,014 A | * | 2/1970 | Ask .................................. 172/4.5 |
| 3,749,035 A | | 7/1973 | Cayton et al. |
| 4,031,963 A | | 6/1977 | Poggemiller et al. |
| 4,176,721 A | | 12/1979 | Poggemiller et al. |
| 5,479,992 A | | 1/1996 | Bassett |
| 5,897,287 A | * | 4/1999 | Berger et al. .................. 414/699 |
| 6,266,586 B1 | | 7/2001 | Gagnon |

(Continued)

FOREIGN PATENT DOCUMENTS

| | | |
|---|---|---|
| DE | 102012011542 | 12/2013 |
| EP | 1724730 | 11/2006 |

(Continued)

*Primary Examiner* — Robert Pezzuto
*Assistant Examiner* — Joel F. Mitchell
(74) *Attorney, Agent, or Firm* — Rebecca L. Henkel; Rickard K. DeMille

(57) ABSTRACT

A method and system for controlling operation of a tractor and/or agricultural implement towed by the tractor is provided. A vibration sensor is mounted to the agricultural implement to detect the magnitude of vibration, or bounce, on the agricultural implement. Because the magnitude of the vibration is a function of several operating parameters including, but not limited to, the speed at which the tractor is travelling and the downward pressure applied to the agricultural implement, one or more additional sensors are provided to monitor these operating parameters. Each of the sensors generates a feedback signal and transmits it to the controller. The controller is configured to generate a reference signal to control an actuator as a function of the magnitude of vibration and the measured operating parameter. The actuator receiving the reference signal is configured to control operation of the tractor or agricultural implement to reduce the magnitude of vibration.

15 Claims, 5 Drawing Sheets

(56) References Cited

U.S. PATENT DOCUMENTS

| | | | |
|---|---|---|---|
| 6,701,857 B1 | 3/2004 | Jensen et al. | |
| 6,856,878 B2 * | 2/2005 | Braunhardt | A01B 63/00 56/10.2 R |
| 7,360,495 B1 | 4/2008 | Martin | |
| 7,584,696 B2 | 9/2009 | Verhaeghe et al. | |
| 8,074,586 B2 | 12/2011 | Garner et al. | |
| 8,078,367 B2 * | 12/2011 | Sauder et al. | 701/50 |
| 2002/0107625 A1 | 8/2002 | Beck et al. | |
| 2003/0130766 A1 | 7/2003 | Braunhardt et al. | |
| 2005/0177297 A1 | 8/2005 | Berger et al. | |
| 2006/0090680 A1 | 5/2006 | Wendte et al. | |
| 2006/0265106 A1 | 11/2006 | Giles et al. | |
| 2008/0257569 A1 * | 10/2008 | Foster et al. | 172/9 |
| 2010/0051298 A1 * | 3/2010 | Smith et al. | 172/2 |
| 2011/0184551 A1 | 7/2011 | Kowalchuk | |
| 2011/0303137 A1 | 12/2011 | Tevs et al. | |
| 2013/0292144 A1 * | 11/2013 | Zhu et al. | 172/2 |

FOREIGN PATENT DOCUMENTS

| | | |
|---|---|---|
| JP | 5115210 | 5/1993 |
| WO | 2012015957 A1 | 2/2012 |

\* cited by examiner

SYSTEM AND METHOD OF TRACTOR CONTROL BASED ON AGRICULTURAL IMPLEMENT PERFORMANCE

BACKGROUND OF THE INVENTION

The subject matter disclosed herein relates generally to agricultural implements towed behind a tractor, and in particular, to automatic control of the tractor and/or agricultural implement as a function of the vibration detected in the attached implement.

One type of planting implement, sometimes referred to as an air drill, is towed behind a tractor and is commonly equipped with one or more row units. The row units are attached to the air drill frame by individualized arms or linkages which allow the row units to operate independently of another. This "independence" allows each row unit to independently respond to changes in terrain and field obstructions, for example, by moving in a vertical direction.

Each row unit includes, for example, a ground engaging device such as a point, a shank, or a coulter disc to open a furrow in a field, a product distribution system to distribute product to the field, and a closing system to put dirt over the product in the field. The ground engaging device cuts a furrow or trench in the soil into which seed and/or fertilizer is deposited. The seed and/or fertilizer is metered from an air cart, also towed behind the tractor, and supplied by a pneumatic system to the air drill. At the air drill, the seed is distributed to individual rows and dropped through a tube into the trench cut by the ground engaging device. Each row unit may further include closing discs to push the soil displaced by the ground engaging device back over the trench, covering the seed and/or fertilizer as the closing discs pass. A trailing wheel or ganged packer wheel assembly then packs the soil atop the seed and/or fertilizer. The amount of packing pressure applied by the trailing (packer) wheel may be adjusted by a spring which biases the trailing (packer) wheel against the field.

When the ground engaging device is a coulter disc, each coulter disc of the row unit has a generally flat construction that is rotated a few degrees, e.g., 7 degrees, about a vertical axis. As the coulter disc is pulled through the soil, the leading surface of the coulter disc displaces soil and creates a furrow in the soil. Downward pressure on the coulter disc is provided by a spring, air bag, or hydraulic cylinder to hold the coulter disc at a desired furrowing depth, e.g., desired seeding depth. The depth at which the coulter disc cuts the furrow into the soil is controlled by a gauge wheel that runs in relative close proximity to the coulter disc. In addition to its depth controlling function, for some disc drills, the placement of the gauge wheel close to the coulter disc also assists in keeping the disc surface clean of soil, mud, or debris buildup. The gauge wheel rides over the soil displaced by the coulter disc as the furrow is being cut to prevent the displaced soil from being thrown.

It is desirable to maintain a uniform distribution of seed and/or fertilizer. The operator configures the metering system to deliver the seed from the air cart at a desired distribution rate to achieve a desired spacing of the seed in each row. However, it is known that rough or uneven terrain can cause vibration, or bounce, in the row units, resulting in uneven distribution of seed or excessive variation in the depth of the furrow and/or the amount of soil packed over the furrow. Thus, it would be desirable to control operation of the tractor and the towed implement to minimize the amount of vibration in the row units.

SUMMARY OF THE INVENTION

The present invention provides a method and system for controlling operation of a tractor and/or an agricultural implement being towed by the tractor to improve performance of the agricultural implement. A vibration sensor is mounted to the agricultural implement to detect the magnitude of vibration, or bounce, present on the agricultural implement. The vibration sensor generates a feedback signal corresponding to the magnitude of vibration and transmits it to a controller. Because the magnitude of the vibration is a function of several operating parameters, including, but not limited to, the speed at which the tractor is travelling and the downward pressure applied to agricultural implement, one or more additional sensors are provided to monitor these operating parameters. Each additional sensor generates a feedback signal corresponding to the operating parameter being monitored and transmits it to the controller. The controller is configured to generate a reference signal used to control an actuator as a function of the magnitude of vibration and of the operating parameter. The actuator is configured to control operation of the tractor and/or agricultural implement to reduce the magnitude of vibration on the agricultural implement.

According to one embodiment of the invention, a system for reducing vibration of a row unit on an agricultural implement configured to be towed behind a tractor is disclosed. The agricultural implement has a first frame member coupled to a hitch member and a plurality of row units pivotally connected to the first frame member. The system includes at least one vibration sensor rigidly mounted to one of the row units. Each vibration sensor is configured to generate a feedback signal corresponding to a vibration magnitude of the row unit, and a process sensor is configured to generate a feedback signal corresponding to an operating parameter of the agricultural implement. A controller is configured to receive the feedback signal from the vibration sensor and from the process sensor and to generate a reference signal corresponding to the feedback signal from the process sensor. An actuator is configured to control the operating parameter as a function of the reference signal.

According to one aspect of the invention, the vibration sensor may be an accelerometer. The accelerometer may be configured to generate a plurality of feedback signals, each feedback signal corresponding to an axis of motion.

According to another aspect of the invention, the process sensor is configured to generate the feedback signal corresponding to a speed at which the agricultural implement is moving, and the actuator is a throttle member controlling the speed of an engine in the tractor. Optionally, each row unit includes one of a pneumatic and a hydraulic cylinder applying a downward pressure on the corresponding row unit. The process sensor may be configured to generate the feedback signal corresponding to the downward pressure, and the actuator is a solenoid controlling operation of the pneumatic or the hydraulic cylinder.

According to another embodiment of the invention, a method of controlling performance of an agricultural implement is disclosed. The agricultural implement has a plurality of row units and is configured to be towed behind a tractor. The method includes the steps of receiving an initial command at a controller from one of an operator and a parameter stored in a memory device, generating a reference signal from the controller to an actuator configured to control at least one operating parameter of the agricultural implement as a function of the initial reference command, receiving a first feedback signal at the controller from a vibration sensor mounted on one of the row units, receiving a second feedback signal at the controller from a process sensor corresponding to the operating parameter of the agricultural implement being controlled by the initial reference command, and generating a modified reference signal from the controller to the actuator. The reference signal is transmitted to an actuator to control the operating parameter.

According to another aspect of the invention, the controller may be mounted in the tractor. The process sensor is configured to generate the second feedback signal corresponding to a speed at which the agricultural implement is moving, and the actuator is a throttle member controlling the speed of an engine in the tractor. Optionally, the controller is mounted on the agricultural implement. Each row unit includes either a pneumatic or hydraulic cylinder applying a downward pressure on the corresponding row unit. The process sensor is configured to generate the second feedback signal corresponding to the downward pressure, and the actuator is a solenoid controlling operation of the pneumatic or the hydraulic cylinder.

According to yet another embodiment of the invention, a system for reducing vibration on an agricultural implement configured to be towed behind a tractor includes a vibration sensor mounted to the agricultural implement and configured to generate a feedback signal corresponding to a vibration magnitude of the agricultural implement. A process sensor is configured to generate a feedback signal corresponding to an operating parameter of the agricultural implement. A controller is configured to receive the feedback signal from the vibration sensor and from the process sensor and to generate a reference signal corresponding to the feedback signal from the process sensor. An actuator is configured to control the operating parameter as a function of the reference signal.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

The drawings furnished herewith illustrate a preferred construction of the present invention in which the above advantages and features are clearly disclosed as well as others which will be readily understood from the following description of the illustrated embodiment.

DETAILED DESCRIPTION

The various features and advantageous details of the subject matter disclosed herein are explained more fully with reference to the non-limiting embodiments described in detail in the following description.

Figure 1:
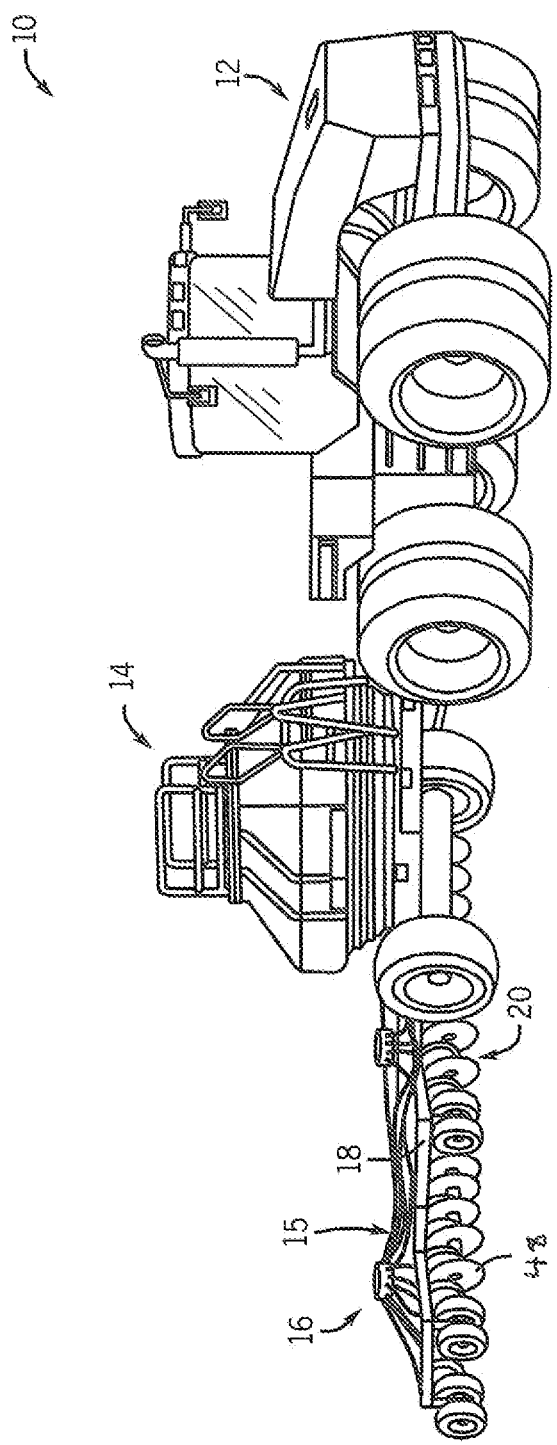
FIG. 1 is a pictorial view of an agricultural system generally comprised of tractor, an air cart, and an air drill.

Referring now to the drawings, and more particularly to FIG. 1, an agricultural seeding system 10 is shown and is generally comprised of a tow vehicle such as a tractor 12, an air cart 14, and an air drill 16. The air cart 14 is hitched to the tractor 12 and the air drill 16 is hitched to the air cart 14 via an appropriate hitch member, such as a ball, clevis, or other coupling. The air drill 16 includes at least one frame member such as a tool bar 18, which is coupled to the hitch member, and a plurality of row units 20 coupled to the tool bar 18. According to one embodiment of the invention, each row unit 20 is configured to cut a furrow into the soil, distribute product, such as seed and/or fertilizer, in the furrow, and close the furrow over the distributed product. As used herein, a row unit is any ground engaging unit of an agricultural implement. Varying numbers and configurations of the row unit 20 may be utilized without deviating from the scope of the invention. Similarly, each row unit 20 may be either rigidly or pivotally coupled to the frame of the air drill 16.

Figure 2:
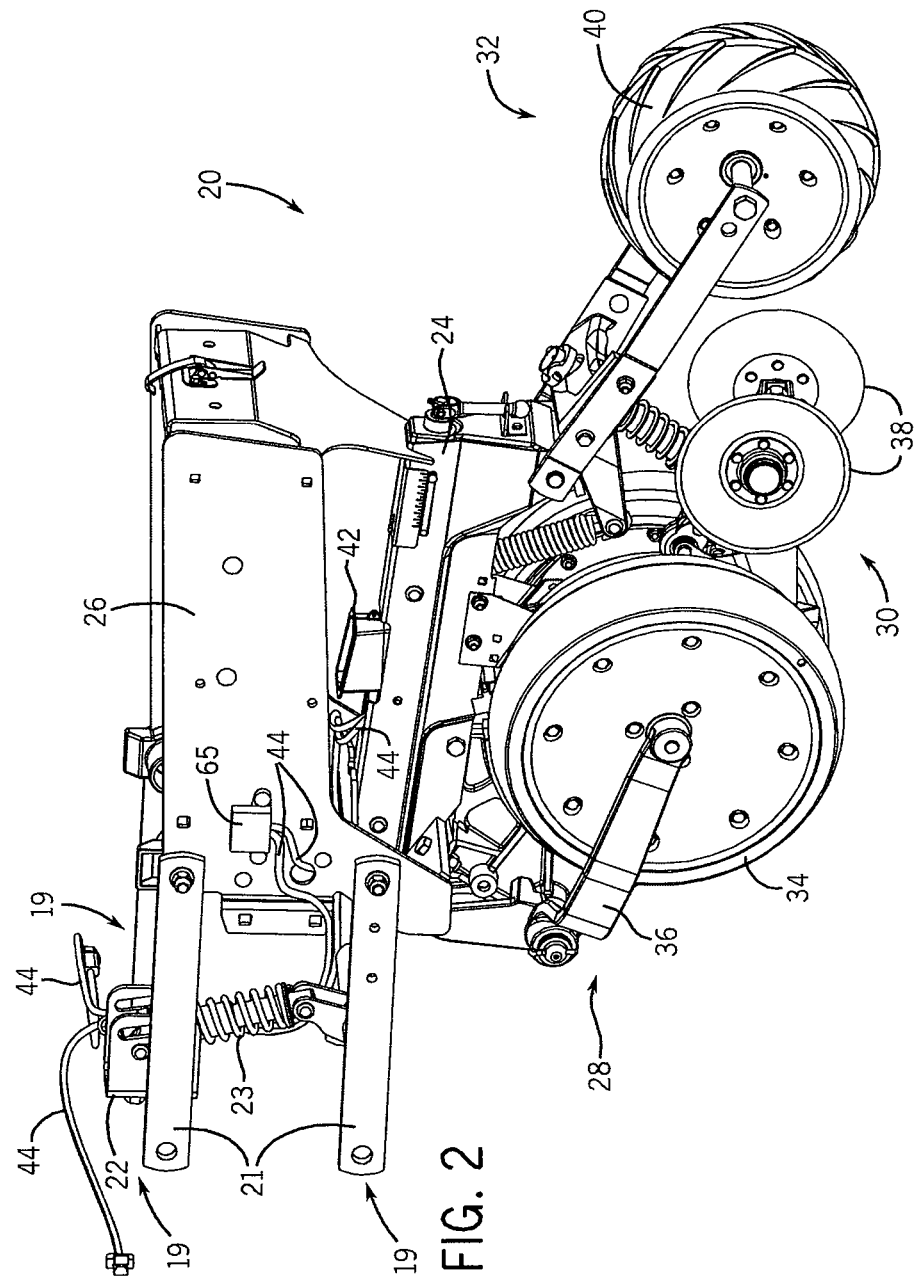
FIG. 2 is an isometric view of an exemplary planter row unit of the air drill of FIG. 1 incorporating an accelerometer according to one embodiment of the invention.

Referring next to FIG. 2, the row unit 20 includes multiple arms 21 of a linkage assembly 19 configured to mount the row unit 20 to the tool bar 18. The linkage assembly 19 is configured to allow vertical movement of each row unit 20 to account for uneven terrain while maintaining a desired downward force such that the row unit 20 remains in contact with the terrain. A biasing member 23 extends between a mounting bracket 22 and a lower arm 21 of the linkage assembly 19 establishing the downward force on the row unit 20. As illustrated, the biasing member 23 is a spring, exerting a constant downward force. An adjustment bracket (not shown) may be used to at least partially compress the spring to vary the amount of downward force applied by the spring. Optionally, the biasing member 23 may include a pneumatic or hydraulic cylinder used in cooperation with or instead of the spring. The pneumatic or hydraulic cylinder may be dynamically controlled to vary the downward force applied to row unit 20.

Figure 3:
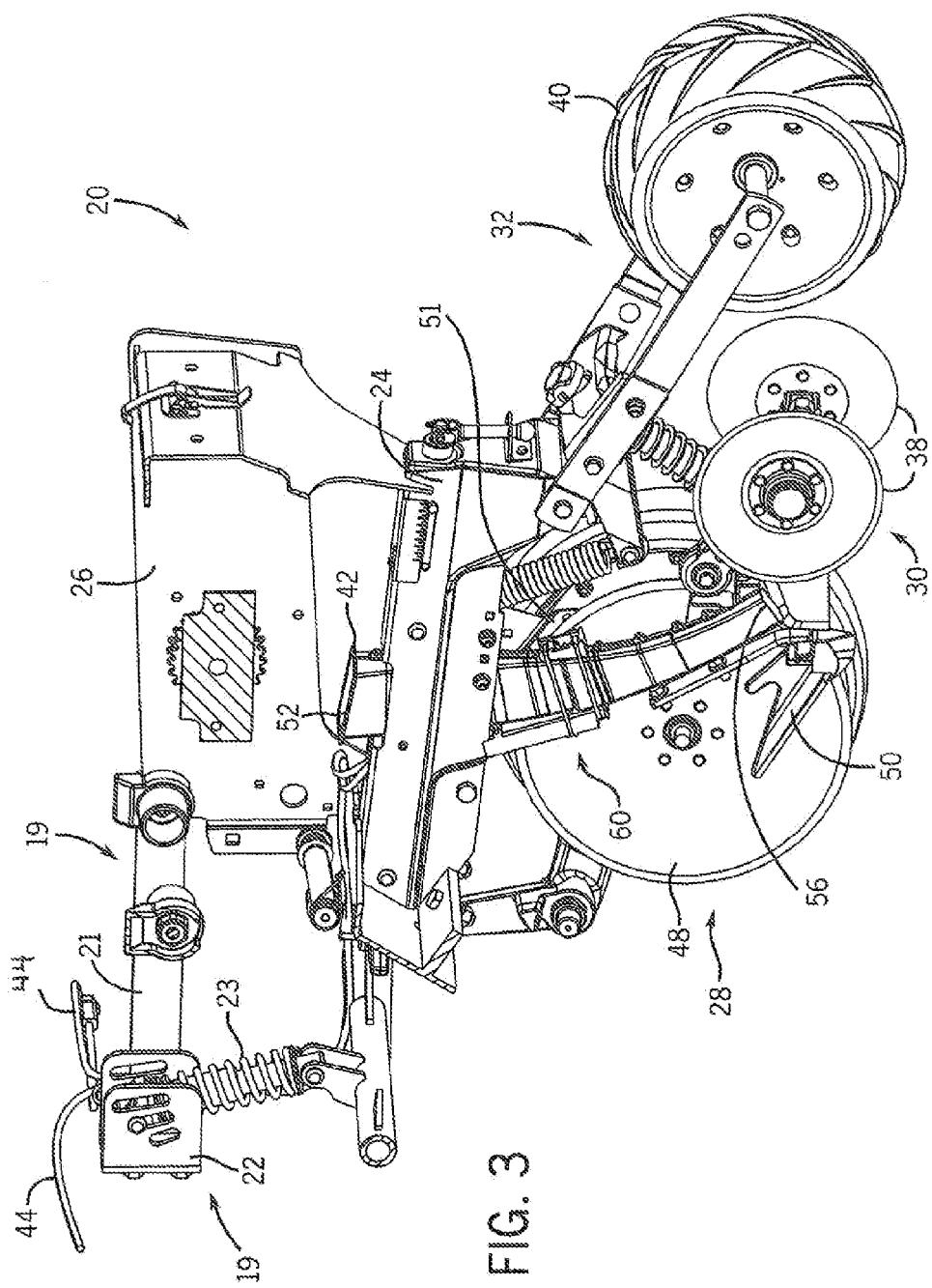
FIG. 3 is a partial perspective view of the exemplary row unit of FIG. 2.

The row unit 20 is configured to support various elements of the row unit 20 according to the configuration of the implement being towed. A chassis 24 and a frame 26 are pivotally mounted to the linkage assembly 19 and configured to receive the various elements of the row unit 20. As illustrated, each row unit 20 includes a coulter assembly 28, a seed tube 42, a soil closing assembly 30, and a packing assembly 32. It is contemplated that various other configurations of the row unit 20 may be utilized without deviating from the scope of the invention. The coulter assembly 28 includes a gauge wheel 34 operatively connected to the chassis 24 via an arm 36. Referring also to FIG. 3, the coulter assembly 28 also includes a coulter disk 48 configured to excavate a furrow, or trench, in the soil. The gauge wheel 34 engages the surface of the field and the height of the coulter disk 48 is adjusted with respect to the position of the gauge wheel 34 to set the desired depth of the furrow being excavated. The coulter assembly further includes a firming point 50 and a scraper 51. The firming point 50 is configured to be drawn through the furrow created by the coulter disk 48, pressing the soil in the bottom of the furrow and establishing a consistent v-shape in which the seeds are placed. The scraper 51 engages the coulter disk 48 to remove soil attached to the disk 48 as the coulter disk 48 rotates past the scraper 51.

The seed tube 42 receives product, such as seed and/or fertilizer, metered from the air cart 14 for distribution in the furrows created by the coulter assembly 28. A pneumatic distribution system blows the product from the air cart 14 to the air drill 16 via a set of hoses 15 (see FIG. 1). The hoses 15 may be routed directly to each row unit 20 or via one or more manifolds and additional distribution hoses on the air drill 16. The product is delivered to the inlet 52 of each seed tube 42 and dispensed at the outlet 56 of each seed tube 42 into the furrow created by the coulter assembly 28. Optionally, an optical sensor 60 may detect product delivered via the seed tube. The optical sensor 60 generates a signal corresponding to product passing the sensor 60 which is transmitted via a communication bus back to a controller 70 (see also FIG. 4) in the tractor 12. The communication bus is established via a network medium, or cable, 44 routed between each row unit 20 and back to the controller 70.

After placing the seed in each furrow, the closing assembly 30 and packing assembly 32 move soil back over the planted seed. The closing disks 38 of the closing assembly 30 are configured to push the excavated soil back over the furrow dug by the coulter assembly 28. The packing wheel 40 of the packing assembly 32 packs the soil back down over the seed. Thus, the illustrated row unit 20 is configured to distribute seeds and/or fertilizer in a uniform manner in rows in the field.

Figure 4:
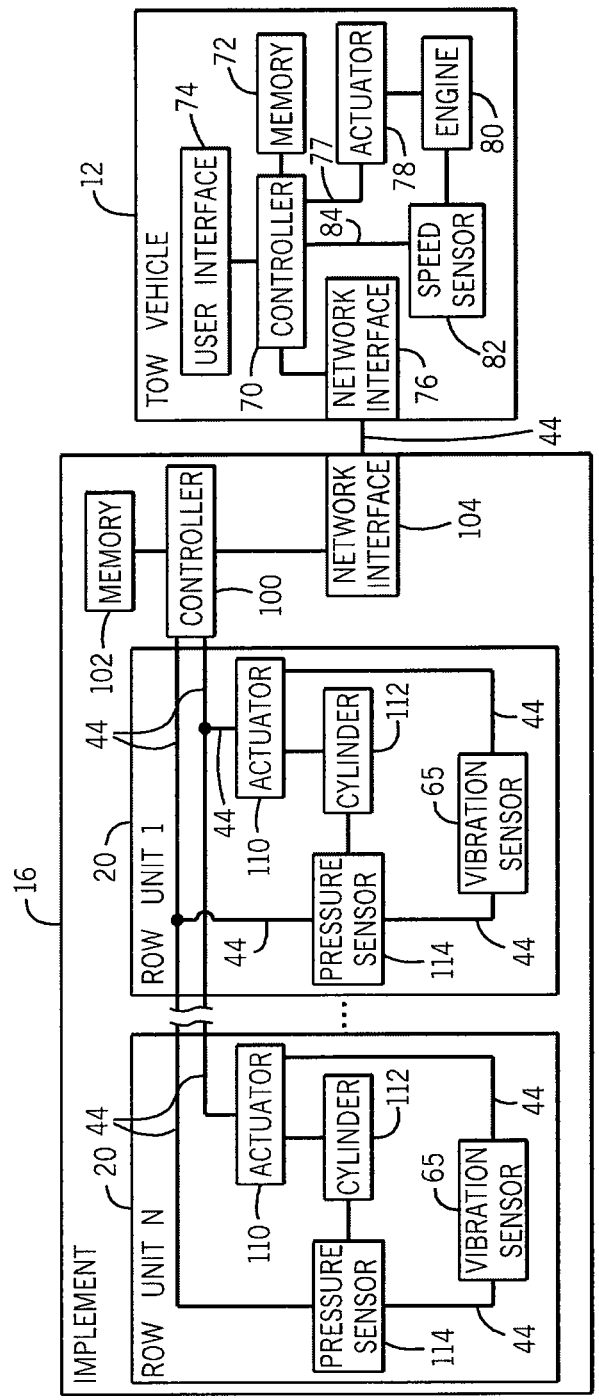
FIG. 4 is a block diagram representation of an exemplary control system of the tractor and air drill of FIG. 1 according to one embodiment of the invention.

Referring next to FIG. 4, one embodiment of a control system for the tractor 12 and air drill 16 is disclosed. The tractor 12 includes a first controller 70 configured to execute one or more program modules stored in a memory device 72. The controller 70 provides information to and receives information from an operator via a user interface 74 such as a touch-screen display. Optionally, the user interface 74 may refer to one or more other devices including, but not limited to, a keyboard, a joystick, pedals, push buttons, switches, displays, or combinations thereof. The controller 70 is configured to communicate with other devices via a network interface 76 and the network media 44 associated with the network. The tractor 12 may include numerous process sensors providing feedback signals to the controller 70 corresponding to various operating parameters of the tractor. A speed sensor 82 such as a tachometer in the engine or a wheel speed sensor is illustrated as a representative process sensor. The controller 70 generates a reference signal 77 to an actuator 78 which controls the speed of the engine 80. The actuator 78 may be, for example, a throttle linkage that increase or decreases the revolutions per minute (rpm) of the engine 80. The speed sensor 82 monitors the speed of the tractor 12 and transmits a feedback signal 84 corresponding to the speed of the tractor to the controller 70.

The air drill 16, representing an exemplary agricultural implement, includes a second controller 100. The controller 100 on the air drill is similarly configured to execute one or more program modules stored in a memory device 102. The controller 100 is configured to communicate with each row unit 20 via appropriate network media 44. The air drill 16 and/or each row unit 20 may include numerous process sensors providing feedback signals to the controller 100 corresponding to various operating parameters of the air drill 16 and/or each row unit 20. A pressure sensor 114 is illustrated as a representative process sensor. The controller 100 generates an reference signal, transmitted via the network media 44 to an actuator 110 which controls operation of a pneumatic or hydraulic cylinder 112. The actuator 110 may be, for example, a solenoid opening or closing a valve to supply air or hydraulic fluid to the cylinder 112. The pressure sensor 114 detects the pressure of air or hydraulic fluid supplied to the cylinder which corresponds to a downward force applied by the cylinder engaging the row unit 20 with the ground. A vibration sensor 65, such as an accelerometer, is mounted on each row unit 20 to detect a magnitude of vibration, or bounce, present on each row unit 20. Optionally, a single vibration sensor 65 may be mounted on the air drill 16, for example, on the tool bar 18. According to still another embodiment of the invention, multiple vibration sensors 65 may be spaced apart on selected row units 20 to detect vibration on various sections of the air drill 16 rather than being mounted on each row unit 20. As illustrated, individual devices are connected on the network media 44 in a daisy-chain configuration. It is contemplated that a star topology, individual conductors, or a combination thereof may be utilized without deviating from the scope of the invention. It is further contemplated that numerous other configurations of controllers 70 and 100, memory 72 and 102, network interfaces 76 and 104, and network media 44 may be implemented without deviating from the scope of the invention. For example, a single controller 70 may be provided on the tractor 12 and directly communicate with the vibration sensor 65, process sensor 114, and actuator 110 on the air drill 16. According to still another embodiment, each row unit 20 may include a separate network interface 104, controller 100, and memory 102.

In operation, the tractor 12 pulls the air cart 14 and air drill 16 to distribute product, such as seed and/or fertilizer, in a field. As the air drill 16 is pulled through the field, each row unit 20 may vibrate, or bounce, when it encounters stones, previous furrows, roots, or other obstacles in the field. As the speed of the tractor 12 increases, the row unit 20 encounters each obstacle at a higher rate of speed, increasing the magnitude of vibration on the row unit. If the magnitude of vibration is too great, variation in the depth of furrows or in the distribution of product may exceed a desired level. The vibration sensor 65 monitors the magnitude of vibration and transmits a feedback signal back to the controller 70 corresponding to this magnitude of vibration.

Figure 5:
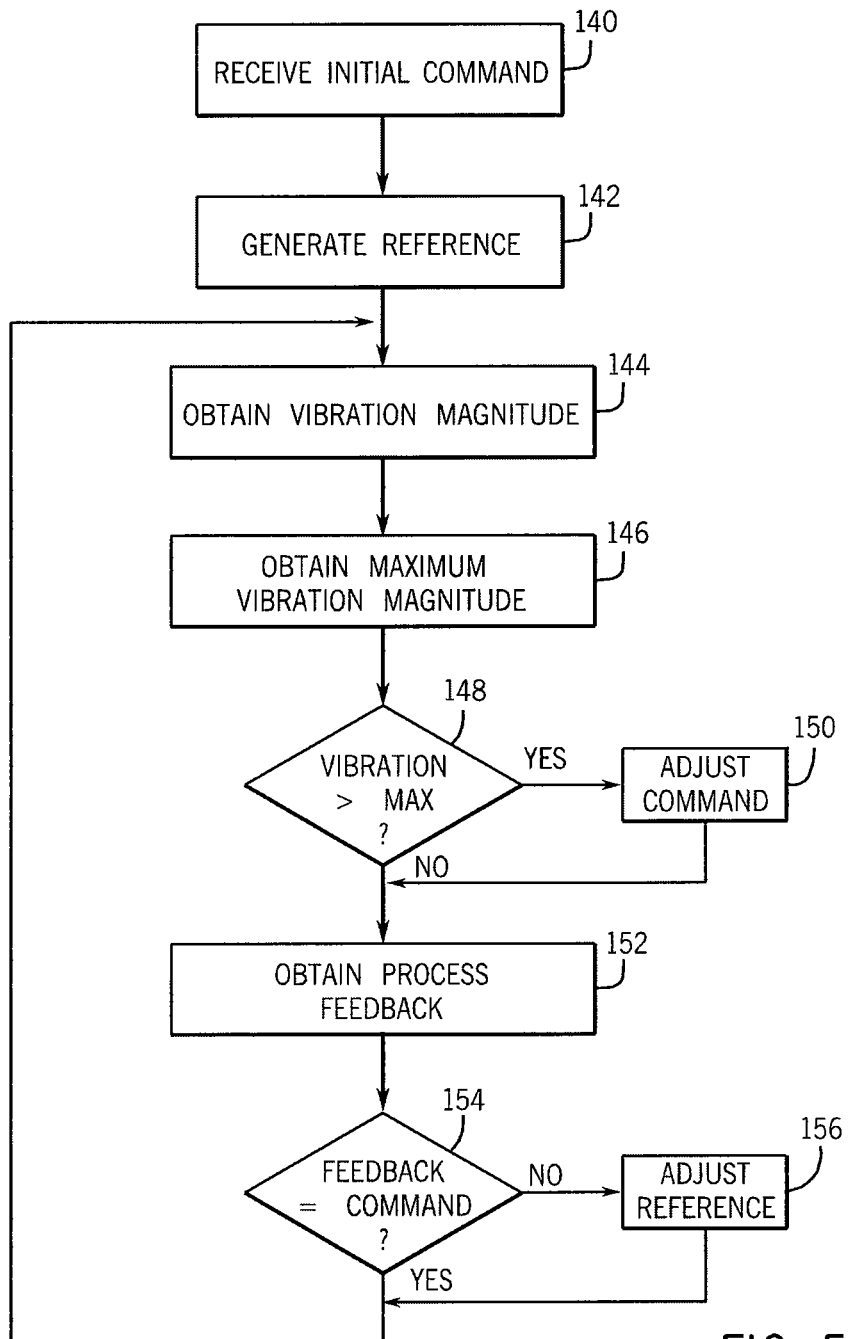
FIG. 5 is a flowchart illustrating the steps for controlling operation of a portion of the agricultural system according to one embodiment of the invention.

The controller 70 executes a program, stored in memory 72, to monitor and, if necessary, reduce the magnitude of vibration. Referring also to FIG. 5, the controller 70 receives an initial command for an operating parameter, such as the desired speed of the tractor 12 or a desired down pressure applied to each row unit 20, as illustrated in step 140. At step 142, the controller 70 further executes a portion of the program configured to control operation of the operating parameter to generate an initial reference signal as a function of the initial command. At steps 144 and 146, the controller 70 receives the feedback signal corresponding to a vibration magnitude from the vibration sensor 65 and reads a preset value, corresponding to a maximum vibration magnitude. The preset value may be entered, for example, by an operator via the user interface 74 and stored in memory 72. At step 148, the controller compares the feedback signal to the preset value. If the feedback signal from the vibration sensor 65 exceeds the preset value, the controller 70 executes a routine to adjust the command for the operating parameter at step 150. The command is adjusted to control operation of the tractor 12 and/or the air drill 16 such that the magnitude of the vibration is reduced. If the feedback signal from the vibration sensor 65 is less than the preset value, the controller 70 obtains a feedback signal from a process sensor, such as a speed sensor 82 or a pressure sensor 114, as shown in step 152. At step 154, the feedback signal is compared against the command value. If the feedback signal is equal to, or within an acceptable range, of the command value, the program module may return execution to obtaining the vibration magnitude of step 144. If the feedback signal is not equal to, or outside an acceptable range, of the command value, the reference value is adjusted, as shown in step 156, to achieve desired control of the operating parameter prior to returning to step 144.

According to one aspect of the invention, the controller 70 is configured to adjust the speed of the tractor 12 as a function of the feedback signal from the vibration sensor 65. The controller 70 receives an initial command for the speed of the tractor 12, for example, from an operator pressing a throttle pedal. The controller 70 generates a reference signal 77 to an actuator 78, which controls the speed of the tractor 12, as a function of the operator pressing the throttle pedal. The actuator 78 may be, for example, a throttle linkage that adjusts the amount of air and/or fuel supplied to the engine 80, which, in turn, varies the revolutions per minute (RPM) at which the engine 80 is operating. As the RPM of the engine 80 increases or decreases and absent other varying conditions, the speed of the tractor 12 increases or decreases. The controller 70 receives feedback signals from a speed sensor 82 and from the vibration sensor 65. The feedback signal 84 from the speed sensor 82 may correspond, for example, to the RPM of the engine 80 or to the RPM detected at the wheels of the tractor 12. The controller 70 executes a program that monitors the magnitude of vibration detected by the vibration sensor 65 and, if the magnitude exceeds a first predefined value, the controller 70 modifies the reference signal 77 output to the actuator 78. The controller 70 may, for example, override the speed commanded by the operator as a function of the operator pressing the throttle pedal and reduce the value of the reference signal 77 output to the throttle linkage, thereby reducing the speed of the tractor 12. Alternately, if the controller 70 detects that the magnitude of the vibration drops below a second predefined value, the controller 70 may increase the value of the reference signal 77 output to the throttle linkage, thereby increasing the speed of the tractor 12. Thus, the controller 70 may decrease the speed of the tractor 12 if the surface of the field is too rough and causes excessive vibration while increasing the speed of the tractor 12 if the surface of the field is relatively smooth and causes little vibration. Optionally, the actuator 78 may be a clutch and shifter to select various gear ratios in a transmission. Alternately, still other devices for adjusting the speed of the tractor 12 that may be electronically controlled may be utilized. Varying the speed of the tractor maximizes planting efficiency while maintaining uniform product distribution. It is further contemplated that limits on the amount the controller 70 can vary the reference signal 77 may be stored in memory 72. Each of the limits, first predefined value, and second predefined value are configurable by the operator via the user interface 74.

According to another aspect of the invention, the controller 100 is configured to adjust the pressure supplied to a pneumatic or hydraulic cylinder 112 functioning as the biasing member 23 to provide a downward force on each row unit 20. The controller 100 receives an initial command for the pressure supplied, for example, from an operating parameter stored in memory 102. The controller 100 generates a reference signal output to an actuator 110 which controls the pressure supplied to the cylinder 112. The actuator 110 may be, for example, a solenoid controlling a valve that adjusts the air or hydraulic fluid provided to the cylinder 112, which, in turn, varies the downward pressure applied to each row unit 20. As the pressure supplied to the cylinder 112 increases or decreases and absent other varying conditions, the downward pressure applied to each row unit 20 increases or decreases. The controller 100 receives feedback signals from a pressure sensor 114 and from the vibration sensor 65. The controller 100 executes a program that monitors the magnitude of pressure applied by each cylinder 112 and modifies the reference signal output to the actuator 110. If the magnitude of the vibration exceeds a first predefined value, the controller 100 increases the value of the reference signal output to the actuator 110, thereby increasing the air or hydraulic fluid supplied to the cylinder 112. Alternately, if the controller 100 detects that the magnitude of the vibration drops below a second predefined value, the controller 100 may decrease the value of the reference signal output to the actuator 110, thereby decreasing the pressure air or hydraulic fluid supplied to the cylinder 112. Thus, the controller 100 may increase the downward pressure applied to each row unit 20 if the surface of the field is too rough, while decreasing the downward pressure applied to each row unit 20 if the surface of the field is relatively smooth and causes little vibration. Varying the downward pressure on each row unit 20 maximizes planting efficiency while maintaining uniform product distribution. It is further contemplated that limits on the amount the controller 100 can vary the reference signal may be stored in memory 72. Each of the limits, first predefined value, and second predefined value are configurable by the operator via the user interface 74.

According to another aspect of the invention, a single vibration sensor 65 may be applied to the agricultural implement. The vibration sensor 65 may be rigidly mounted, for example to the tool bar 18 of the air drill 16. A single feedback signal corresponding to overall vibration of the air drill 16 is provided to the controller 100 on the air drill 16 and/or the controller 70 in the tractor 12. The feedback signal from this single vibration sensor 65 may be used as described above for multiple vibration sensors 65 mounted on individual row units 20.

According to yet another aspect of the invention, the controller 70 on the tractor may receive feedback signals from multiple vibration sensors 65. If a vibration sensor 65 is mounted on each row unit 20, the controller 70 may determine an average value of the feedback signals and use the average value to control the speed of the tractor 12. Optionally, a maximum vibration setting may be stored in memory 72 and the controller 70 may reduce the speed of the tractor 12 if any one of the vibration signals exceeds the maximum vibration setting. It is contemplated that still other operating parameters of the tractor 12 and/or agricultural implement may be monitored and similarly controlled as a function of the magnitude of vibration detected.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present inven-

I claim:

1. A system for reducing vibration of a row unit on an agricultural implement configured to be towed behind a tractor having an engine, the agricultural implement having a first frame member coupled to a hitch member and a plurality of row units pivotally connected to the first frame member, the system comprising;
   a vibration sensor rigidly mounted to one of the row units, the vibration sensor configured to generate a feedback signal corresponding to a vibration magnitude of the one of the row units;
   a process sensor configured to generate a feedback signal corresponding to a speed of the engine;
   a first electronic controller operatively connected to the vibration sensor and the process sensor for receiving the feedback signal from the vibration sensor and the feedback signal from the process sensor, the first electronic controller configured to generate a reference signal as a function of the feedback signal from the vibration sensor and the feedback signal from the process sensor; and
   an actuator operatively connected to the first electronic controller and the engine, the actuator:
      adapted to receive the reference signal from the first electronic controller; and
      configured to control the speed of the engine;
   wherein:
      an increased reference signal is generated by the first electronic controller in response to the feedback signal exceeding a first threshold;
      a decreased reference signal is generated by the first electronic controller in response to the feedback signal falling below a second threshold;
      the actuator is configured to decrease the speed of the engine without input from an operator of the tractor and in response to the increased reference signal so as to reduce vibration of the row unit; and
      the actuator is configured to increase the speed of the engine without input from an operator of the tractor and in response to the decreased reference signal.

2. The system of claim 1 wherein the vibration sensor is an accelerometer.

3. The system of claim 2 wherein the accelerometer is configured to generate the feedback signal generated by the vibration sensor, the feedback signal generated by the accelerometer corresponding to an axis of motion.

4. The system of claim 1 further comprising:
   a second electronic controller operatively connected to the vibration sensor for receiving the feedback signal from the vibration sensor;
   a second process sensor operatively connected to the second controller for transmitting a second feedback signal from the second process sensor to the second controller; and
   a plurality of row unit actuators, each row unit actuator operatively connected to a corresponding row unit of the plurality of row units;
   wherein:
      each row unit includes one of a pneumatic and a hydraulic cylinder applying a downward pressure on the corresponding row unit,
      the second process sensor is configured to generate the second feedback signal corresponding to the downward pressure, and
      each row unit actuator operatively connected to a corresponding row unit of the plurality of row units is a solenoid controlling operation of the pneumatic or the hydraulic cylinder.

5. The system of claim 1 wherein each of the row units includes a vibration sensor and wherein the first electronic controller is configured to receive a feedback signal from each of the vibration sensors.

6. The system of claim 5 wherein the first electronic controller is further configured to compare each of the feedback signals received from the vibration sensors to a preset value corresponding to a maximum vibration magnitude, and when one of the feedback signals received from the vibration sensors is greater than the preset value, causing the actuator to automatically adjust the speed of the engine to reduce the vibration magnitude.

7. The system of claim 5 wherein the first electronic controller is further configured to determine an average value of each of the feedback signals received from the vibration sensors to compare the average value to a preset value corresponding to a maximum vibration magnitude, and when the average value is greater than the preset value, generating the increased reference signal so as to cause the actuator to automatically increase the speed of the engine to reduce the vibration magnitude.

8. A method of controlling performance of an agricultural implement, wherein the agricultural implement has a plurality of row units and is configured to be towed behind a tractor having an engine, the method comprising the steps of:
   receiving an initial command at an electronic controller from one of an operator and a parameter stored in a memory device;
   generating a reference signal transmitted from the electronic controller to an actuator configured to control a speed of the engine of the tractor;
   receiving a first feedback signal at the electronic controller from a vibration sensor mounted on one of the row units;
   receiving a second feedback signal at the controller from a process sensor corresponding to the speed of the engine being controlled by the initial command; and
   generating a modified reference signal transmitted from the electronic controller to the actuator in response to the first and second feedback signals;
   wherein:
      when the first feedback signal exceeds a first preset value corresponding to a maximum vibration magnitude, the actuator is configured to decrease the speed of the engine without input from an operator of the tractor and in response to the modified reference signal so as to reduce vibration on an agricultural implement; and
      when the first feedback signal fails below a second preset value, the actuator is configured to increase the speed of the engine without input from an operator of the tractor and in response to the modified reference signal.

9. The method of claim 8 comprising the additional step of mounting the electronic controller in the tractor.

10. The method of claim 8 comprising the additional step of mounting a second electronic controller on the agricultural implement.

11. The method of claim 10 comprising the additional steps of:
   applying a downward pressure on each of the row units;
   generating a downward pressure feedback signal corresponding to the downward pressure; and configuring the second electronic controller to adjust the downward pressure in response to the first feedback signal and the downward pressure feedback signal.

12. A system for reducing vibration on an agricultural implement configured to be towed behind a tow vehicle having an engine, the system comprising:
- a vibration sensor mounted to the agricultural implement and configured to generate a first feedback signal corresponding to a vibration magnitude of the agricultural implement;
- a process sensor configured to generate a second feedback signal corresponding to a speed of the engine;
- an electronic controller operatively connected to the vibration sensor and the process sensor and being configured to receive the first feedback signal from the vibration sensor and the second feedback signal from the process sensor, the electronic controller generating a reference signal as a function of the first and second feedback signals; and
- an actuator operatively connected to the engine and to the electronic controller, the actuator:
  - adapted for receiving the reference signal from the electronic controller; and
  - configured to:
    - decrease the speed of the engine when the first feedback signal exceeds a first threshold without input from an operator of the tow vehicle and in response to the reference signal so as to reduce vibration on an agricultural implement; and
    - increase the speed of the engine when the first feedback signal is below a second threshold without input from an operator of the tow vehicle and in response to the reference signal.

13. The system of claim 12 wherein the vibration sensor is an accelerometer.

14. The system of claim 13 wherein the accelerometer generates the first feedback signal, the first feedback signal corresponding to an axis of motion.

15. The system of claim 12 further comprising:
- a second process sensor operatively connected to a row unit of the agricultural implement; and
- a second actuator operatively connected to the row unit of the agricultural implement;

wherein:
- the row unit includes one of a pneumatic and a hydraulic cylinder applying a downward pressure on the corresponding row unit;
- the second process sensor is configured to generate a downward pressure feedback signal corresponding to the downward pressure; and
- the second actuator is a solenoid controlling operation of the pneumatic or the hydraulic cylinder.

* * * * *